(12) United States Patent
Ito

(10) Patent No.: US 6,226,727 B1
(45) Date of Patent: May 1, 2001

(54) COMPUTER SYSTEM

(75) Inventor: Seigo Ito, Hanno (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/154,784

(22) Filed: Sep. 17, 1998

(30) Foreign Application Priority Data

Sep. 18, 1997 (JP) .................................................. 9-253713

(51) Int. Cl.⁷ .................................................. G06F 12/00
(52) U.S. Cl. .................................................. 711/170; 711/171
(58) Field of Search .................................. 711/170, 171, 711/111, 112, 4, 173

(56) References Cited

U.S. PATENT DOCUMENTS 5,485,321    1/1996    Leonhardt et al. .

*Primary Examiner*—Matthew Kim
*Assistant Examiner*—Jan S. Williams, II
(74) *Attorney, Agent, or Firm*—Finnegan, Henderson, Farabow, Garrett & Dunner, L.L.P.

(57) ABSTRACT

In a computer system having a recording/ reproducing device in which a DVD-RAM or the like is used as a recording medium, the CPU and the memory allocates logical blocks and record blocks, in multiple units of a common block for data to be written on a recording medium. The common blocks have a size of the least common multiple of the size of logic block and the size of record block, and the front of the allocated logical blocks coincides with the front of the allocated record blocks. The data is recorded on the recording medium by the recording/ reproducing device. Hence, the data can be recorded in the most desirable manner even if the logical blocks and the record blocks defer in size.

19 Claims, 5 Drawing Sheets

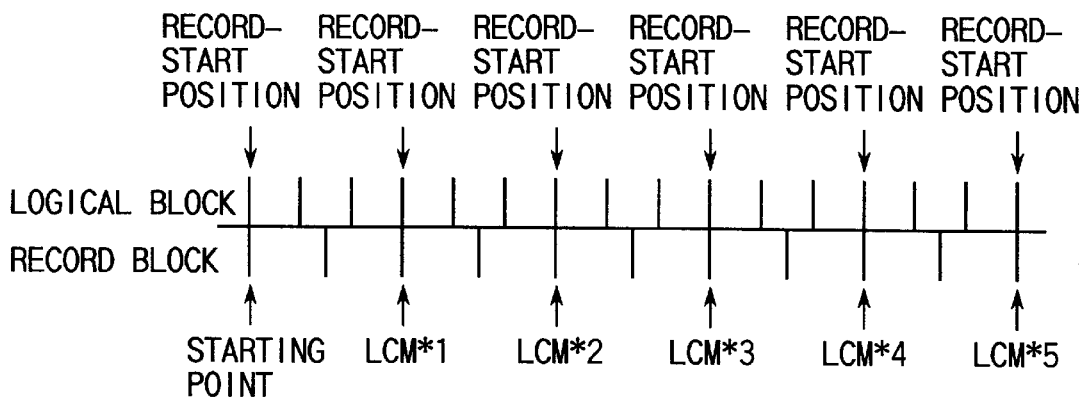
FIG. 3
FIG. 4
| LOGICAL BLOCK NUMBER | EMPTY AREA FLAG |
|---|---|
| 1 | 0 |
| 2 | 1 |
| 3 | 1 |
| 4 | 1 |
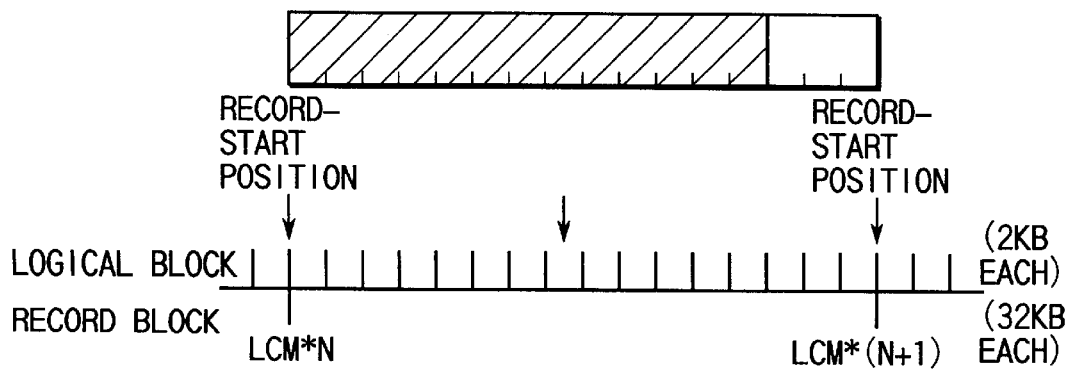
FIG. 5

COMPUTER SYSTEM

BACKGROUND OF THE INVENTION

The present invention relates to a computer system having a recording/reproducing device which uses a DVD-RAM or the like as a recording medium. More particularly, the invention relates to a computer system that can record data in the most desirable manner even if a logical block and a record block differ in size.

This application is based on Japanese Patent Application No. 09-253713 filed on Sep. 18, 1997, the content of which is cited herein by reference.

Generally, a recording/reproducing device (recording media device) can be connected to or incorporated in a personal computer or a portable computer, so that it may be used as an external memory.

The file system (i.e., the computer), which manages the writing of data into and the reading of data from an external memory, has two types of data blocks. The first type is a logical block, which is a logical unit of data. The second type is a record block, which is a unit of data to be written into or read from the recording medium provided in the external memory.

In the actual data-writing process, not only the data managed in the form of the logical block, but also error correction codes and the like are recorded on the recording medium. This means that the record block has the same size as a unit of data to be subjected error correction. The record block must be identified in the file system so that the file system may efficiently access to the recording media device. To this end, the recording media device is designed to access the file system in the logical block, which corresponds to the record block. The file system manages data such as files, in units of logical blocks, efficiently exchanging data with the recording medium.

As indicated above, the logical block which the file system manages and the record block which is a unit of data to be written into or read from the recording medium by the recording media device have the same size in most cases. In some file systems, the size of the logical block may be defined to the multiple size of the record block. This is because the number of logical blocks which the file system can manage is limited, and the number of logical blocks must be reduced.

Manufacture of recording media of a large storage capacity has been started, thanks to the recent developed technique of increasing recording density. Streams of image data and streams of sound data are recorded on a recording medium which has a large storage capacity. It is better to perform error correction on such a recording medium which has a large storage capacity in units of larger data blocks than in units of relatively small data blocks as conventionally employed. The reason is that the overhead is smaller when the data is corrected in units of larger blocks, ultimately enhancing the storage efficiency. Therefore, the size of the record block may be larger on a recording medium of large storage capacity.

In some cases, however, the size of the logical block cannot be larger corresponding to the size of the record block. If the logical blocks are made as large as the record blocks, they may no longer be compatible with the logical blocks on the conventional recording medium, or may no longer conform to the applied standards. For example, the EEC (Error Correcting Code) blocks (i.e., record blocks) on a DVD (Digital Versatile Disc) have a size of 32 KB, whereas the logical blocks on the DVD have a size of 2 KB as is designated on the basis of the standards. In other words, an error correction code (ECC) is added to every 16 logical blocks. When the logical blocks differ in size from the record blocks as in this case, the speed of accessing the recording medium and reliability may inevitably decrease.

BRIEF SUMMARY OF THE INVENTION

The first object of the present invention is to provide a computer system which can improve access speed and reliability in recording and reproducing even if a logical block have a size different from the size of a record block.

The second object of the invention is to provide a data management method for use in data processing apparatus.

To achieve the first object, there is provided a computer system in which logical blocks and record blocks are set in different size. The computer system comprises: allocation means for allocating the logical blocks and the record blocks in multiple units of a common block for data to be written in writing the data on a recording medium, the common block having a size of the least common multiple of the size of the logical block and the size of the record block, and the front of the allocated logical blocks coinciding with the front of the allocated record blocks; managing means for instructing that the data be written in multiple units of a common block allocated by the allocation means; and writing means for writing the data on the recording medium in accordance with instructions given by the managing means.

To achieve the second object, there is provided a data management method applied to a data processing apparatus in which logical blocks and record blocks are set in different size. The method comprises a step of allocating the logical blocks and the record blocks in multiple units of a common block for data to be written in writing the data, the common block having a size of the least common multiple of the size of the logical block and the size of the record block, and the front of the allocated logical blocks coinciding with the front of the allocated record blocks.

In this computer system described above, logical blocks and record blocks are allocated in multiple units of a common block for data to be written in writing data on a recording medium and the front of the allocated logical blocks coincides with the front of the allocated record blocks. Hence, a plurality of extents can not exist in the same record block. This prevents errors from occurring in the data not being accessed, even if troubles occur in reading or writing any other data.

Since the managing means instructs that the data be written in multiple units of a common block allocated by the allocation means, it suffices to read data in record blocks corresponding to the units of common blocks into a memory. This may improve the access speed.

In the computer system, the allocation means may be designed to divide the data into parts having a size equal to or smaller than a multiple size of the common block when the data has a size larger than that of the common blocks.

Alternatively, the allocation means may be designed to change the allocation when the recording medium has come to have a defect, thereby to replace the allocated common block having a defect with another common block in which no data has been recorded.

As described above, data is divided into parts having a size equal to or smaller than a multiple size of common block in the computer system of this invention, and the system can therefore process data at an increased speed. Even if the recording medium has come to have a defect, the common block having the defect can be replaced by another common block in which no data has been recorded. This also may improve the data-processing speed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

FIG. 3 is a diagram illustrating the relationship between logical blocks and record blocks in the embodiment;

FIG. 4 is a table showing information on the empty area of the logical blocks, used in the embodiment;.

FIG. 5 is a diagram illustrating the relationship between logical blocks and record blocks in a DVD-RAM;

DETAILED DESCRIPTION OF THE INVENTION

An embodiment of the present invention will be described with reference to the accompanying drawings.

Figure 1:
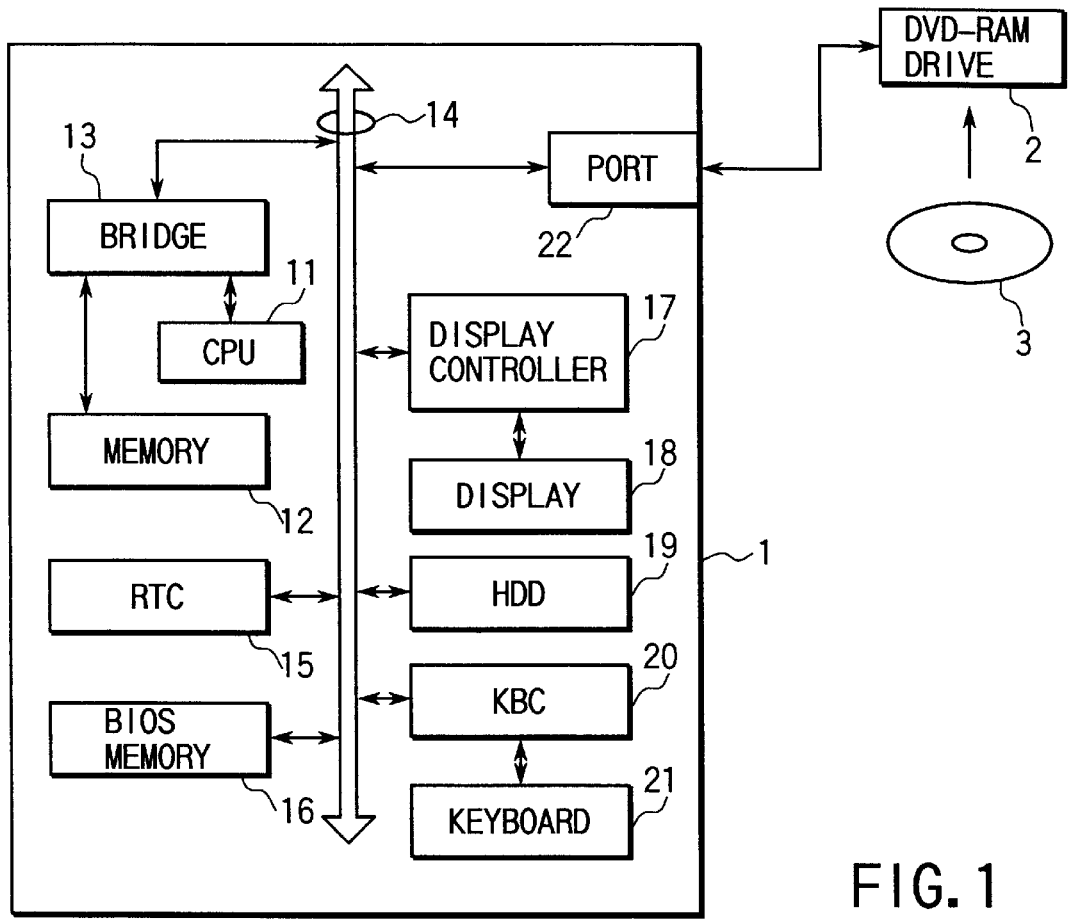
FIG. 1 is a block diagram showing a computer system according to an embodiment of the present invention.

FIG. 1 shows a block diagram of a computer system according to the embodiment of the invention. The computer system comprises a computer 1 and a DVD-RAM drive 2. The computer 1 is either a personal computer or a portable computer. The DVD-RAM drive 2 records data on a DVD-RAM 3 which is a recording medium of large storage capacity and to reproduce data therefrom.

The computer 1 incorporates a CPU (Central Processing Unit) 11, a memory 12 and a bridge 13. The CPU 11 controls other components of the computer 1. The bridge 13 connects the memory 12 to the CPU 11. The memory 12 stores programs, data and the like. The CPU 11 controls the process of storing data into the DVD-RAM 3 (i.e., a recording medium), in the form of logical blocks and record blocks with reference to the program stored in the memory 12 and the flag showing empty areas which is mentioned below. The logical blocks have one size, and the record blocks have another size. More precisely, in the present embodiment, each logical block managed by the file system of the computer 1 has a size of 2 KB and each record block managed by the DVD-RAM drive 2 has a size of 32 KB corresponding to DVD-RAM 3.

A PCI bus or the like can be used for the system bus 14. The bridge 13 is connected to the system bus 14 of the computer 1 and controls transferring data between the system bus 14 and the CPU 11 and the memory 12. A PCI bus or the like can be used for the system bus 14. Various kinds of components are connected to the system bus 14.

The RTC (Real Time Clock) 15, the BIOS memory 16 which stores a BIOS (Basic Input/Output System), the display controller 17, HDD (Hard Disk Drive) 19 and KBC 20 (Key Board Controller) are connected to the system bus 14 in this computer 1.

The RTC 15 supplies a prescribed clock signal via the bus 14 to the other components of the computer 1. The BIOS memory 16 stores a BIOS, which is a hardware-dependent control program. The BIOS memory 16 can be a flash memory which is a rewritable nonvolatile ROM so that the BIOS may be rewritable.

The display 18, which is a CRT, a LCD or the like, is connected to the display controller 17. The display controller 17 displays image data on the display 18. The HDD 19 records magnetically records data on a hard disc. A keyboard 21 and a mouse which is not shown in FIG. 1 are connected to the KBC 20. The KBC 20 sends the data inputted by operating the keyboard 21 and the mouse to the system bus 14. The port 22 is used for interface connecting the DVD-RAM drive 2 to the computer 1.

Figure 2:
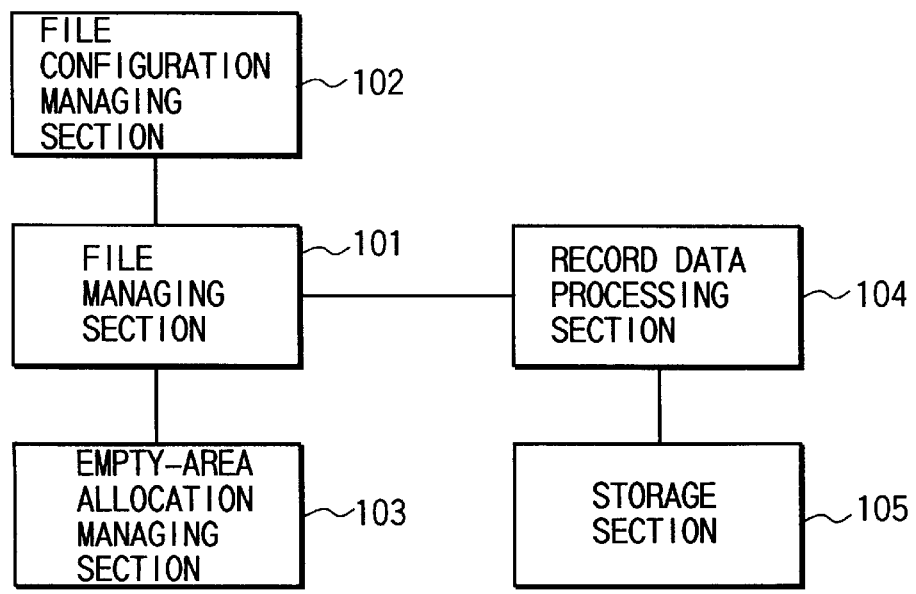
FIG. 2 is a block diagram showing the functional sections incorporated in the embodiment shown in FIG. 1.

From a functional point of view, the computer system shown in FIG. 1 comprises five sections as shown in FIG. 2.

The file managing section 101 manages the data to be recorded on a recording medium, in accordance with the information supplied from the file configuration managing section 102 and empty-area allocation managing section 103. The file configuration managing section 102 manages files of directory hierarchy, in accordance with a prescribed management table. The empty-area allocation managing section 103 retrieves empty areas, whenever necessary, to allocate the empty areas in the logical blocks as storage areas for file data. The functions of the file managing section 101, file con figuration managing section 102 and empty-area allocation managing section 103 are performed by the CPU 11 and the memory 12 of the computer 1.

The record data processing section 104 writes data into the storage section 105 in accordance with instructions given by the file managing section 101. The functions of the record data processing section 104 and the storage section 105 are performed by the DVD-RAM drive 2 and DVD-RAM 3.

The management function of the empty-area allocation managing section 103 will be explained, with reference to FIG. 3. In FIG. 3, each logical block is 2 KB in size, each record (or physical) block is of 3 KB in size, and the front of the first logical block coincides with the front of the first physical block. The front of succeeding logical block coincide with the front of succeeding physical blocks at each least common multiple (LCM) of the size of the logical block and the size of the physical block. An "empty area" is a group of blocks which are dispersed in a logical block space and in which no data is recorded.

A block whose size is the least common multiple of the logical-block size and physical-block size is called a "common block."

When the file managing section 101 requests an extent, which is a request to allocate additional blocks, the empty-area allocation managing section 103 designates a new common block starting position (starting position (=LCM*0), LCM*1, LCM*2, LCM*3, . . . ) which is an integer multiple of the least common multiple (LCM) of the logical-block size and physical-block size. In the instance shown in FIG. 3, each common block is 6 KB in size, because 6 KB is the least common multiple of the logical-block size of 2 KB and the physical-block size of 3 KB. An error correction code (EICC) is added to each physical block, that is for each 3 KB. As mentioned above, data is stored in units of common blocks which have a size of 6 KB. Hence, two ECCs are added to each common block when data is stored.

The empty-area allocation managing section 103 determines whether the logical blocks have been used with reference to the empty-area flags which show empty areas and are provided to each logical block. FIG. 4 shows empty-area flags which are assigned to, for example, each logical block illustrated in FIG. 3. Each flag indicates that the storage area corresponding to the logical block is empty if it is "1", and that the storage area has been used if it is "0".

In the case shown in FIG. 4, the empty-area flag of the logical block No. 1 is "0", indicating that the storage area has been used.

When the file managing section 101 requests to designate an empty storage area to write data, the empty-area allocation managing section 103 designates the logical block 4 whose empty-area flag is "1" and whose front is at the second record-start position as an empty storage area. This is because the logic block 1 whose front is at the first record-start position has already been used. The empty-area allocation managing section 103 does not designate the logical blocks 2 and 3, since the fronts of the logical blocks 2 and 3 are not at record-start positions, though the empty-area flags for these logical blocks are "1" and these logical blocks have not been used.

As shown in FIG. 4, the empty-area flags are assigned to the logical blocks. Instead, addresses, for example, may be assigned to the logical blocks, and empty-area flags may be assigned to the addresses.

The management function described above will be explained in detail, with reference to FIG. 5.

As has been described, the logical blocks processed in the DVD-RAM file system have a size of 2 KB and the record blocks processed in the record media device have a size of 32 KB. To provide storage areas for new file to be recorded in the form of logical blocks, the empty-area allocation managing section 103 allocates logical blocks in units of 32 KB, i.e., the least common multiple of the logical-block size (2 KB) and the record-block size (32 KB) from empty areas. As shown in FIG. 5, the first of the logical blocks forming each 32 KB unit has its head which is at the position of multiples of the least common multiple mentioned above. The data is stored into the DVD-RAM 3 by means of the DVD-RAM drive 2.

Though the data to be stored has a size of 26 KB as illustrated in FIG. 5, the unit of 32 KB which is the least common multiple of the logical-block size and the record-block size is allocated to the data and this data will be recorded in a unit of 32 KB which is the same size as the record-block size (32 KB) on the recording medium. One ECC is assigned to each record block as described above. Thus, an ECC is assigned to each 32 KB record block in this instance.

To store additional files, the file configuration managing section 102 may enlarge or modify the table for managing the directory hierarchy. In this case, the table enlarged or modified is stored into the recording medium by the record media device. If the file configuration managing section 102 needs a storage area to record a new table for managing files, the logical blocks are allocated in units of 32 KB in the same way as described above.

When file data which has already been stored may be changed by modifying the file and the size of the file data changed does not exceed 32 KB, no new logical block is not allocated, and the file data is written in the logical blocks which have already been allocated.

How data is written into the recording medium will be explained, with reference to the flow chart of FIG. 6 and also to FIGS. 7A and 7B.

Figure 7A:
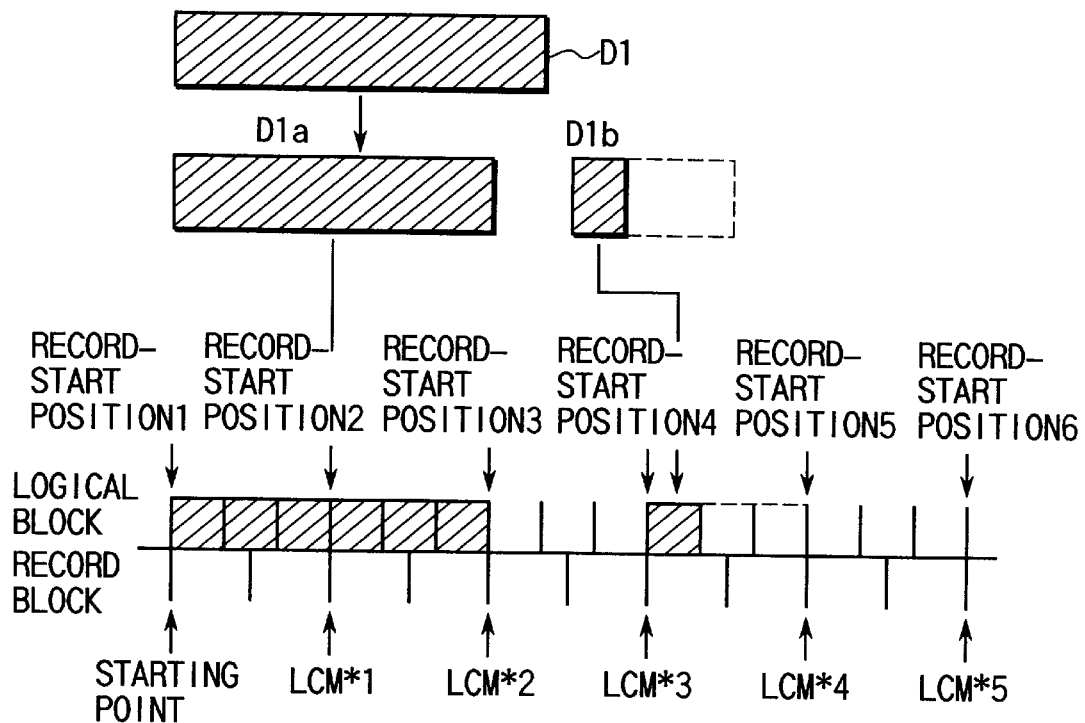
FIGS. 7A and 7B are diagrams for explaining the process of writing data whose size is larger than that of the record blocks in the embodiment.
Figure 7B:
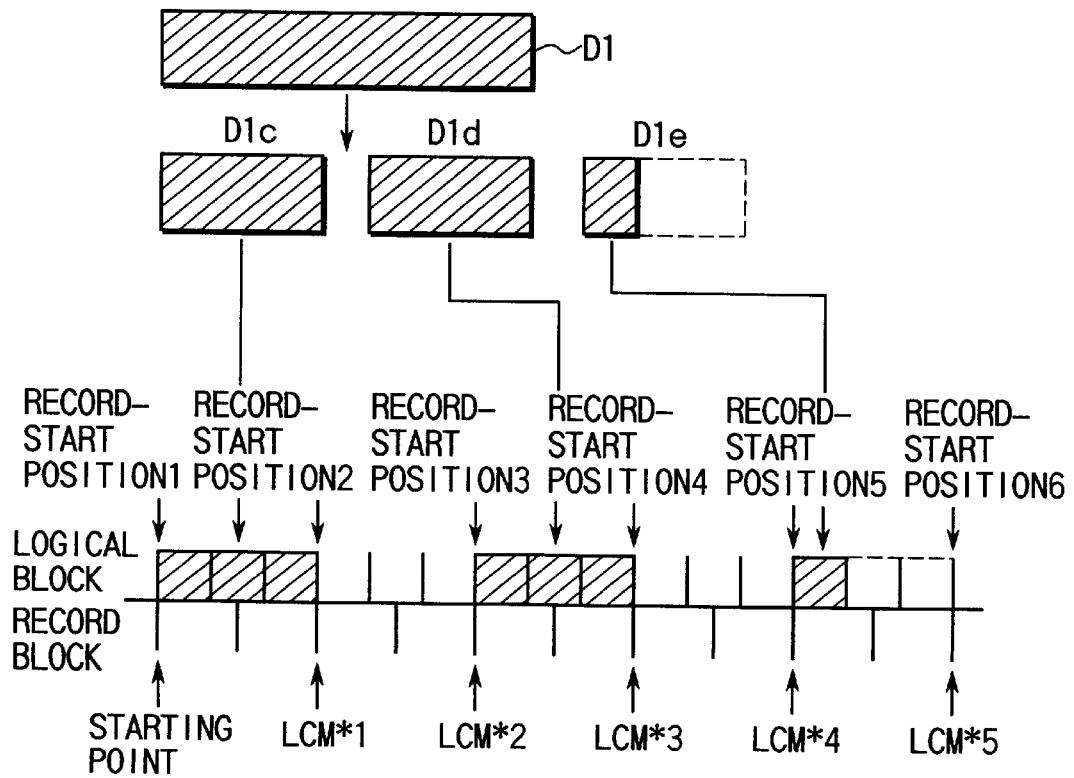

To simply and generally explain the operation, each logical block has a size of 2 KB and each record block has a size of 3 KB in the format shown in FIGS. 7A and 7*b*, as in the format illustrated in FIG. 3. Each common block, which is the unit in which data to be written, has its head coinciding with the head of a logical block and the head of a record block. The common block has a size of 6 KB, i.e., the least common multiple of the logical-block size (2 KB) and the record-block size (3 KB).

How data which has a size of 14 KB is written in this format on the recording medium will be explained. The size of data D1 to be written is 14 KB in FIGS. 7A and 7B.

Figure 6:
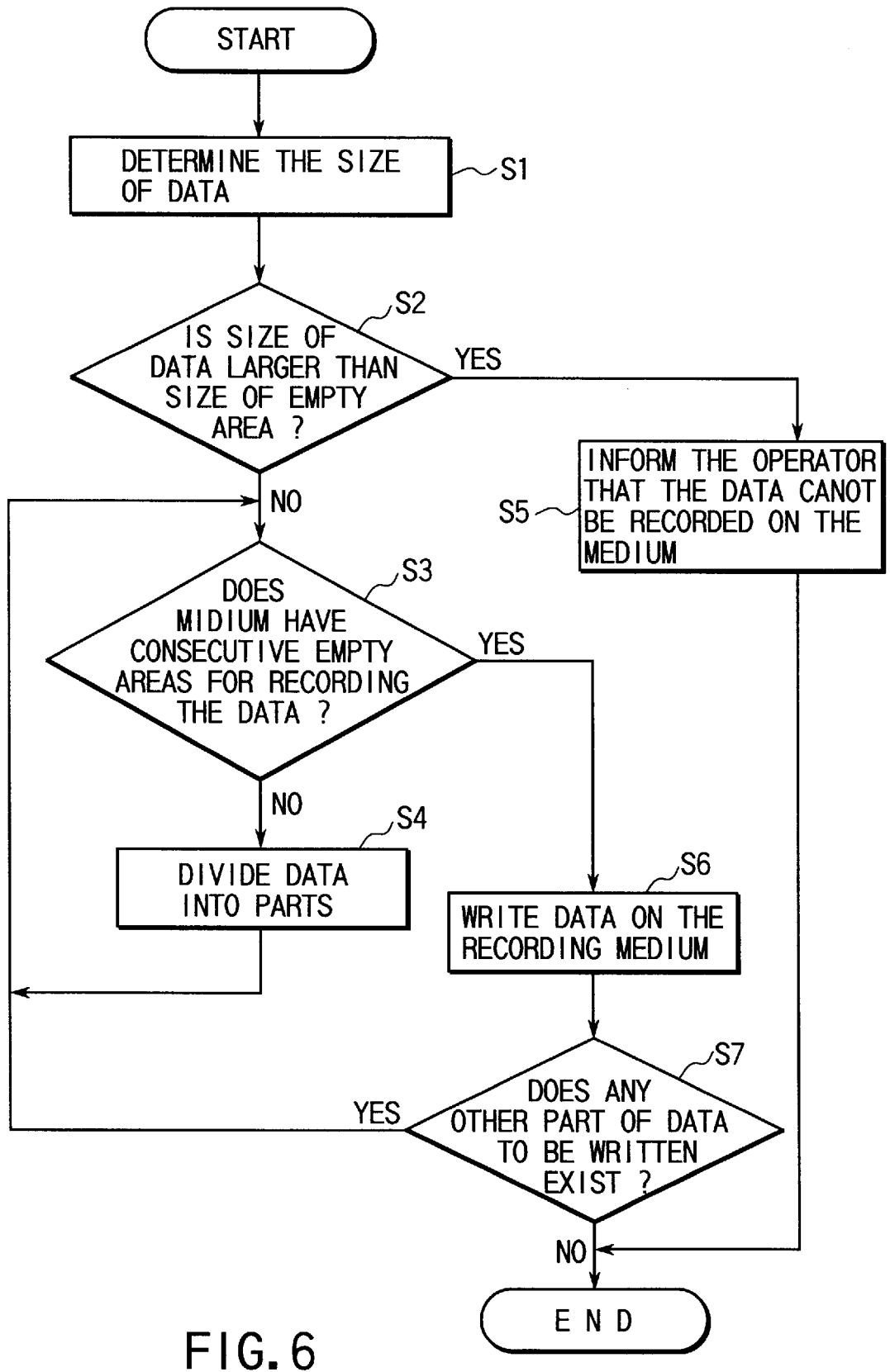
FIG. 6 is a flow chart explaining the procedure of writing data in the first embodiment.

First, in step S1 of FIG. 6, the size of the data to be written is determined. More precisely, the file managing section 101 determines that the data D1 to be written has a size of 14 KB in FIGS. 7A and 7B.

In step S2 in FIG. 6, it is determined whether the data to be written has a size larger than the size of any empty area available on the recording medium. In FIGS. 7A and 7B, it is determined whether or not the recording medium has an empty area large enough to store 14 KB of data. If the size of the data to be written is larger than the size of any empty area, that is, if the recording medium has no empty area large enough to store the data to be written, it is informed to the operator that the data cannot be recorded on the recording medium in step S5 of FIG. 6.

On the other hand, if the size of the data to be written is equal to or smaller than the size of the empty area, it is determined whether the medium has consecutive empty areas large enough to store the data to be written in step S3 of FIG. 6. If YES, the data is written on the recording medium in step S6 of FIG. 6. If NO, in step S4 of FIG. 6 the data to be written is divided into parts so that the data may be written in consecutive empty areas that are as large as possible. Then, the operation returns to step S3 of FIG. 6. In step S3, it is determined whether the medium has consecutive empty areas large enough to store the divided data. If YES in step S3, the data is written on the recording medium in step S6. Then, in step S7 it is determined whether or not any other part of data to be written exists. If NO in step S7, the process of writing data finishes, since all data to be written have already been written on the recording medium. If YES in step S7, the operation returns to steps S3 and the same operations are made as mentioned above, until all data is written on the recording medium.

In the example shown in FIGS. 7A and 7B, each common block has a size of 6 KB, which is the unit of writing data into a recording medium. Therefore, it is determined in step S3 of FIG. 6 whether the recording medium has consecutive empty areas whose total size is equal to or larger than 14 KB and is a multiple of 6 KB. That is, it is determined whether the recording medium has consecutive empty areas whose total size is 18 KB.

In the example shown in FIGS. 7A and 7B, the recording medium has no consecutive empty areas whose total size is equal to or larger than 18 KB. In this case, the recording medium does not have 18 KB-size consecutive empty areas and the data D1 of 14 KB is divided into the data D1*a* of 12 KB and the data D1*b* of 2 KB in step S4 of FIG. 6, as is illustrated in FIG. 7A. Then, the operation returns to step S3 of FIG. 6. In step S3, it is determined whether the recording medium has consecutive empty areas whose total size is 12 KB. The recording medium has such consecutive empty areas, and the data D1*a* is written therein. Thereafter, it is determined in step S7 of FIG. 6 whether or not any other remaining data which has not been written exits. In this instance, the data D1*b* of 2 KB has not been written. Hence, the operation returns to step S3 of FIG. 6, in which it is determined whether the recording medium has consecutive empty areas whose size is equal to or larger than 2 KB. Since the medium has such consecutive empty areas, the data D1*b* can be written in these empty areas. Though the data D1*b* is 2 KB-size, free data of 4 KB is added to the data D1b, forming data of 6 KB, which is written in the recording medium.

When the recording medium has no consecutive empty areas whose size is 12 KB, unlike in the case of FIG. 7A, the data D1 of 14 KB is divided into three smaller data items, i.e., data D1c of 6 KB, data D1d of 6 KB and data D1e of 2 KB, as is illustrated in FIG. 7B. Data D1c, D1d and D1e are written on the recording medium in the order as mentioned above.

It should be noted that, in the case shown in 7A the logical block at the record-start position 3 has already been used and in the case shown in FIG. 7B the logical block at the record-start position 2 and the logical block at the record-start position 4 have already been used.

The process of writing data explained above will be further described in comparison with the conventional process of writing data.

Figure 8A:
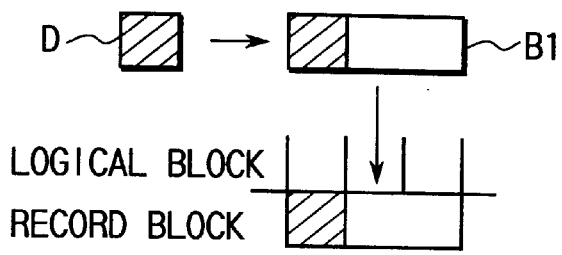
FIG. 8A is a diagram explaining the process of writing data in the embodiment.
Figure 8B:
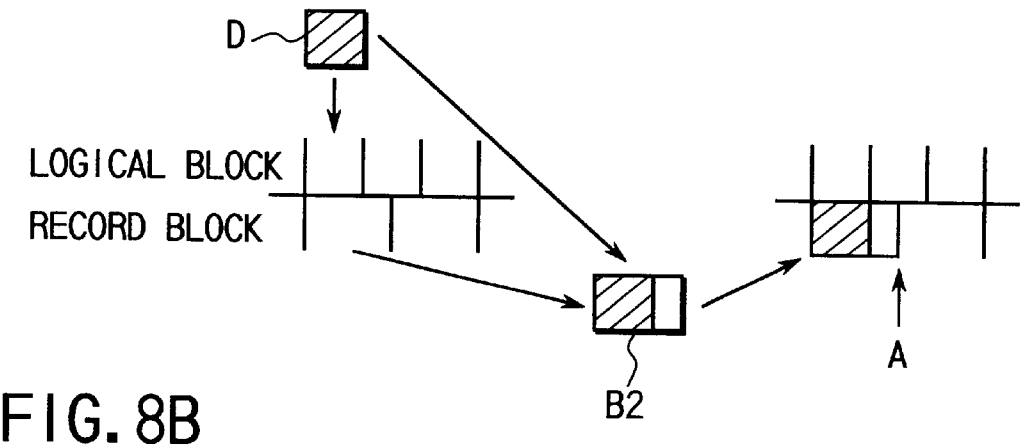
FIG. 8B is a diagram explaining the conventional process of wiring data.

FIG. 8A is a diagram explaining the process of writing data in the embodiment, and FIG. 8B is a diagram explaining the conventional process of wiring data. To simply explain the process, it is assumed that logical blocks have a size of 2 KB and record blocks have a size of 3 KB.

In the conventional data-writing process shown in FIG. 8B, it is impossible to write a logical block D which has a size of 2 KB in a record block in order to record the logical block D on a recording medium. This is because the record block B2 has a size of 3 KB, the excessive 1 KB-area of the record block other than 2 KB-area which is the same size as the logical block D to be written may has data, and the data in the 1 KB-area must be held even after the logical block D is recorded in the record block B2.

In the process of writing data, the content of the record block of 3 KB is read into the memory. The content of the logical block of 2 KB is written and added to the content of the record block in the memory. Then the content of both the record block and the logical block is written on the recording medium in the unit of 3 KB-size which is the same size as the record block;

If the logical block had the same size as the record block, the logical block would become a record block and could be written directly onto the recording medium. However, the size of the logical block is smaller than that of the record block. Hence, the process of reading the record block into the memory must be required. Consequently, the time of accessing the record block increases.

The conventional process of writing data is disadvantageous in another respect. If a trouble arose in writing the combination of the content of the logical block and the content of the record block on the recording medium in the unit of the record block, the trouble would affect the last 1 KB part A of the record block that has not been accessed by the user.

In the data-writing process of this embodiment illustrated in FIG. 8A, empty areas are allocated to have their heads located at the positions of multiples of the least multiple common of the logical-block size and record-block size. Any data is recorded on the recording medium in units of common blocks which have a size of 6 KB, i.e., the least common multiple (LCM) of the logical-block size and record-block size. Time is not wasted as in the conventional data-writing process. Any data other than the accessed data is not affected as in the conventional data-writing process, when a trouble occurs. The volume of the data to be written and read in the data-writing process of this embodiment is more than in the conventional data-writing process. Nonetheless, the loss of time resulting from this is very little. If the recording medium is a disc and two processes of reading and writing data are performed as in the conventional data-writing process, a time for rotating the disc through 180° or more is wasted, on average.

Figure 9:
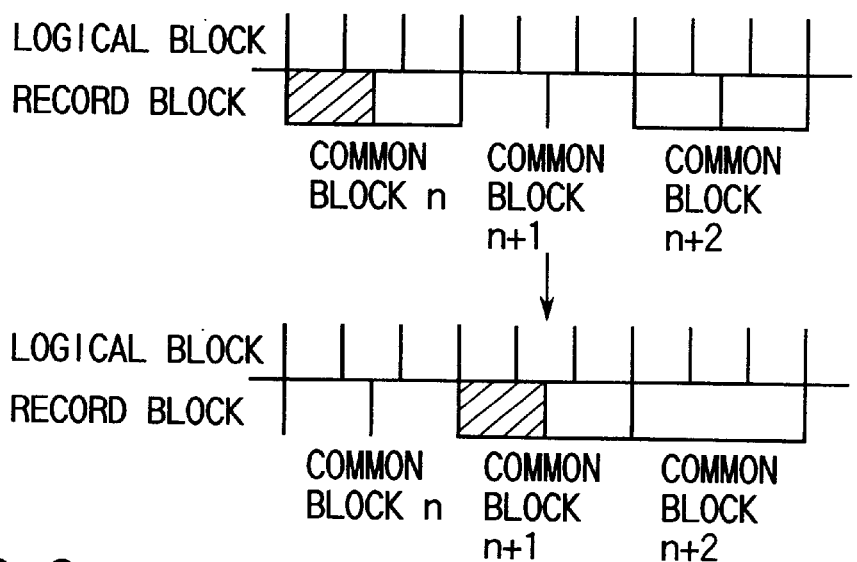
FIG. 9 is a diagram for explaining how to manage a common block when the recording medium has defects.

If the recording medium happen to have defects, logical blocks and record blocks which have defects may be replaced in the size of the common block by another common block in which no data has been recorded, as is illustrated in FIG. 9.

In the case illustrated in FIG. 9, each logical block has a size of 2 KB and each record block has a size of 3 KB. Hence, the size of the common block is 6 KB. Three common blocks, i.e., the nth block, the (n+1)th block and the (n+2)th block, are shown in FIG. 9. FIG. 9 illustrates that nth common block happens to have a defect and is replaced by the (n+1)th common block. Data is written in the nth common block and the (n+2)th common block, and no data is written in the (n+1)th common block. The nth common block happens to have a defect. Therefore, the nth common block is replaced by the (n+c)th common block in which no data has been written. As a result, the nth common block no longer holds data.

The DVD-RAM drive 2 may be incorporated in the computer 1. Furthermore, the DVD-RAM drive 2 may have a CPU and a memory.

A recording medium like a DVD recently has an increased storage capacity. Image data and audio data, either being a great amount of data, are recorded on the recording medium. Therefore, the recording process with higher efficiency is demanded. The recording efficiency is proportional to the size of record blocks, provided that the error-correcting efficiency remains unchanged. In fact, the record blocks on the DVD have a size of 32 KB, much larger than the size (2 KB) of the record blocks in the CD-ROM, so that data may be recorded on the DVD with high efficiency. To exchange data efficiently between a file system and a recording medium, the size of the logical blocks may be increased in accordance with the size of the record blocks. If the logical blocks are made as large as the record blocks, however, they will no longer be compatible with the logical blocks on the conventional recording medium, or will no longer conform with the applied standards. In view of this, the logical blocks on the DVD have the same size of 2 KB as the logical blocks on the CD-ROM, whereas the record blocks on the DVD have a size of 32 KB.

The computer system according to the present invention can realize the efficient data-writing process in spite of the fact described above.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed:

1. A computer system for managing data in units of logical blocks, wherein the logical blocks are of a different size than physical blocks of a recording medium, said system comprising:

means for allocating a plurality of logical blocks of a first size to a plurality of physical blocks of a second size by assigning the logical blocks to common blocks of a third size, the third size being the least common multiple of the first and second sizes; and means for writing the data on the recording medium in units of the common blocks.

2. The computer system of claim 1, wherein said writing means further comprises means for dividing the data into parts having a size equal to or smaller than a multiple of the size of the common blocks when the data has a size larger than the size of the common blocks.

3. The computer system of claim 1, wherein said allocating means further comprises means for changing the allocation when the recording medium has a defect by replacing the common block containing the defect with another common block in which no data has been recorded.

4. A computer system for managing data in units of logical blocks, wherein the logical blocks are of a different size than physical blocks of a recording medium, said system comprising:

a CPU;

a memory; and a writing device;

wherein said CPU allocates a plurality of logical blocks of a first size to a plurality of physical blocks of a second size by assigning the logical blocks to common blocks of a third size, the third size being the least common multiple of the first and second sizes; and wherein said writing device writes the data on the recording medium in units of the common blocks.

5. A data management method applied to a data processing apparatus for managing data in units of logical blocks, wherein the logical blocks are of a different size than physical blocks of a recording medium, said method comprising a step of:

allocating a plurality of logical blocks of a first size to a plurality of physical blocks of a second size by writing the logical blocks to common blocks of a third size, the third size being the least common multiple of the first and second sizes.

6. The data management method of claim 5, wherein said step of allocating further comprises the substep of dividing the data into parts having a size equal to or smaller than a multiple of the size of the common block when the data has a size larger than the size of the common blocks.

7. The data management method of claim 6, wherein said step of allocating comprises the sub-step of changing the allocation when the recording medium has a defect by replacing one of the common blocks with another common block in which no data has been recorded.

8. A data management method applied to a data processing apparatus, for managing data in units of logical blocks, wherein the logical blocks are of a different size than physical blocks of a recording medium, said method comprising the steps of:

allocating a plurality of logical blocks of a first size to a plurality of physical blocks of a second size by assigning the logical blocks to common blocks of a third size, the third size being the least common multiple of the first and second sizes; and writing the data on the recording medium in units of the common blocks.

9. A data management method applied to a data processing apparatus, the method comprising the steps of:

allocating logical blocks of size 2 KB to physical blocks of size 32 KB by writing the logical blocks into common blocks of size 32 KB which is the least common multiple of 2 KB and 32 KB.

10. The computer system of claim 1, wherein said allocating means allocate., the plurality of logical blocks to the plurality of physical blocks so that a front of one of the logical blocks coincides with a front of one of the physical blocks, within the common blocks.

11. The computer system of claim 10, wherein said allocating means allocates the plurality of logical blocks to the plurality of physical blocks so that the front of a first one of the logical blocks coincides with the front of a first one of the physical blocks, within the common blocks.

12. The computer system of claim 4, wherein the CPU comprises means for allocating the plurality of logical blocks to the plurality of physical blocks so that a front of one of the logical blocks coincides with a front of one of the physical blocks, within the common blocks.

13. The computer system of claim 12, wherein said allocating means allocates the plurality of logical blocks to the plurality of physical blocks so that the front of a first one of the logical blocks coincides with the front of a first one of the physical blocks, within each of the common blocks.

14. The data management method of claim 5, wherein the allocating step includes a sub-step of allocating the plurality of logical blocks to the plurality of physical blocks so that a front of one of the logical blocks coincides with a front of one of the physical blocks, within each of the common blocks.

15. The data management method of claim 14, wherein the allocating step includes a sub-step of allocating the plurality of logical blocks to the plurality of physical blocks so that the front of a first one of the logical blocks coincides with the front of a first one of the physical blocks, within each of the common blocks.

16. The data management method of claim 8, wherein the allocating step includes a sub-step of allocating the plurality of logical blocks to the plurality of physical blocks so that a front of one of the logical blocks coincides with a front of one of the physical blocks, within each of the common blocks.

17. The data management method of claim 16, wherein the allocating step includes a sub-step of allocating the plurality of logical blocks to the plurality of physical blocks so that the front of a first one of the logical blocks coincides with the front of a first one of the physical blocks, within each of the common blocks.

18. The data management method of claim 9, wherein the allocating step includes a sub-step of allocating the plurality of logical blocks to the plurality of physical blocks so that a front of one of the logical blocks coincides with a front of one of the physical blocks, within each of the common blocks.

19. The data management method of claim 18, wherein the allocating step includes a sub-step of allocating the plurality of logical blocks to the plurality of physical blocks so that the front of a first one of the logical blocks coincides with the front of a first one of the physical blocks, within each of the common blocks.

* * * * *

UNITED STATES PATENT AND TRADEMARK OFFICE
CERTIFICATE OF CORRECTION

PATENT NO. : 6,226,727 B1
DATED : May 1, 2001
INVENTOR(S) : Seigo Ito

It is certified that error appears in the above-identified patent and that said Letters Patent is hereby corrected as shown below:

<u>Column 9, claim 6,</u>
Line 33, "substep" should read -- sub-step --.

<u>Column 10, claim 10,</u>
Line 4, "allocate.," should reaad -- allocates --.

Signed and Sealed this

Eighth Day of January, 2002

Attest:

JAMES E. ROGAN
*Attesting Officer*     *Director of the United States Patent and Trademark Office*